United States Patent Office 2,715,854
Patented Aug. 23, 1955

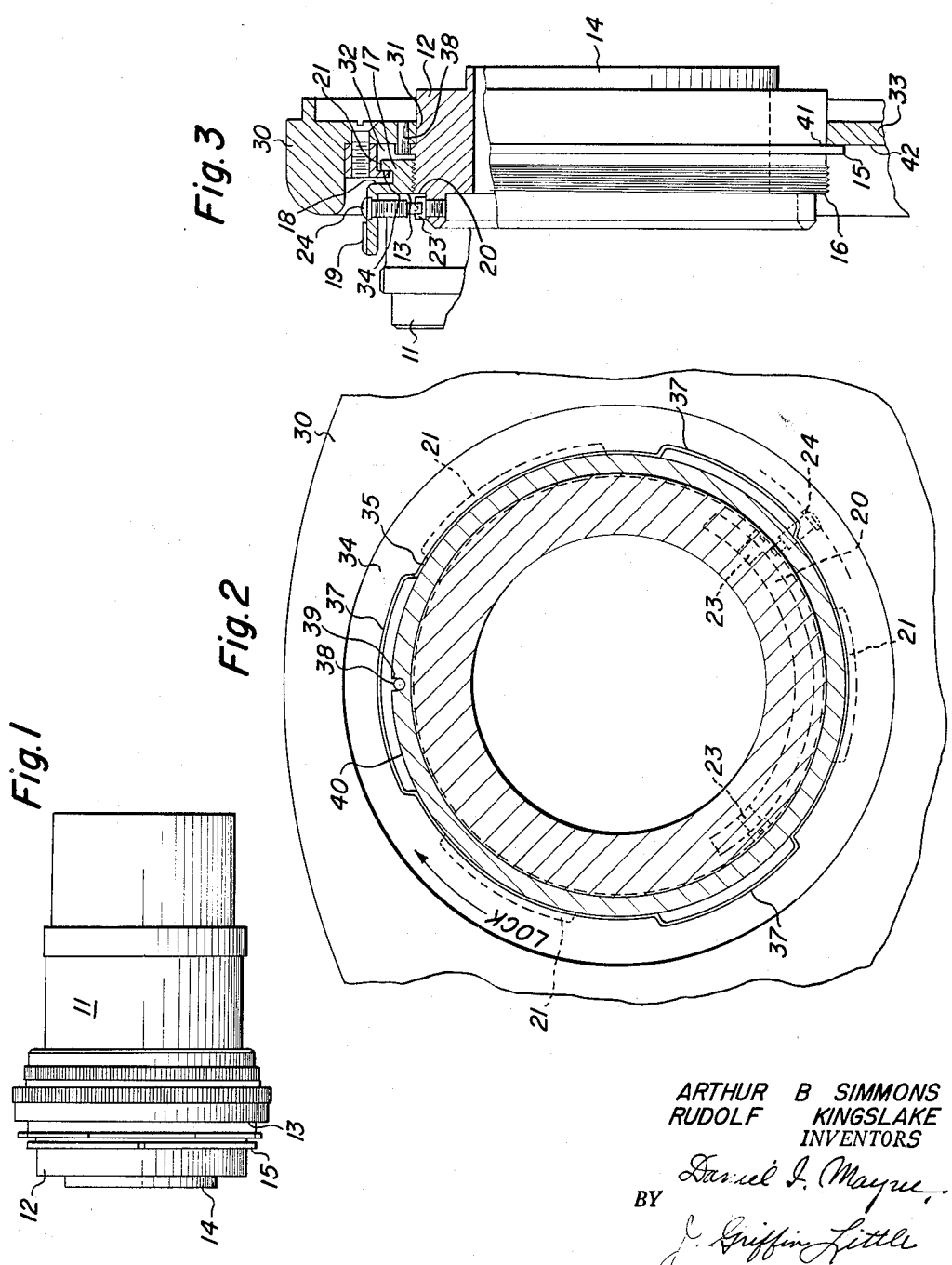

2,715,854

BAYONET LOCK CONSTRUCTION FOR LENS MOUNTS

Arthur B. Simmons and Rudolf Kingslake, Rochester, N. Y., assignors to Eastman Kodak Company, Rochester, N. Y., a corporation of New Jersey Application November 2, 1953, Serial No. 389,558

6 Claims. (Cl. 88—57)

The present invention relates to photography, and more particularly to a lens mount, and a mechanism for securing the mount to a suitable support.

One object of the invention is the provision of a novel means or mechanism for attaching and releasably locking a lens mount to a suitable supporting member.

Another object of the invention is the provision of a means for positioning the mount accurately both axially and radially relative to the support.

And another object of the invention is the provision of attaching and locking means which is simple in structure, comprises few parts of rugged construction, easy to operate and highly effective in use.

Yet another object of the invention is the provision of a lens mount with a new and improved mechanism for attaching the mount easily to a support and to maintain the mount, when attached, in a rigid aligned relation with the support.

To these and other ends the invention resides in certain improvements and combinations of parts, all as will be hereinafter more fully described, the novel features being pointed out in the claims at the end of the specification.

In the drawings:

Fig. 1 is a side elevation view of a lens mount showing the relation thereto of the clamping and locking ring constructed in accordance with the present invention;

Fig. 2 is an end view, with parts in section, showing the relation of the lens mount and its clamping mechanism with the support; and Fig. 3 is a partial side elevation of the lens mount illustrated in Fig. 1, but on a larger scale than the latter and with parts in section, showing the arrangement of the elements of the locking mechanism of the present invention.

Similar reference numerals throughout the various views indicate the same parts.

The present invention is embodied by way of illustration only in a mechanism or bayonet lock for holding and positioning a lens mount releasably on a suitable support, such as a camera, lens board, turret or similar device.

While the present illustration is shown in connection with a lens mount, it is apparent that the bayonet holding or positioning means could be used for attaching members other than lens tubes, such, for example, as filters, diffusing screens, lens mounts, etc. Therefore, the term "lens tube" in the claims is used in a generic sense to include any element which is to be positioned and supported detachably on the supporting member by the bayonet lock positioning and holding mechanism of the present invention. The invention itself resides in the bayonet lock holding and positioning means and not in the specific member or element which is releasably attached to the support.

Referring now to the drawings: Fig. 1 shows a lens tube or similar member formed with a front tubular portion 11 and a rear tubular portion 12 of smaller diameter than portion 11 and connected thereto by a radial shoulder 13. The rear or smaller portion 12 has formed thereon in spaced relation to the rear end 14 thereof, an annular radially extending flange 15, as clearly illustrated in Figs. 1 and 3. Intermediate the flange 15 and the shoulder 13, the portion 12 is provided with a threaded section 16 on which is mounted for axial and rotative movement a similarly threaded collar or sleeve 17 of a locking member. For reasons to be later described, the thread 16 is left handed. Also, the ring 17 has an external diameter which is substantially equal to that of the flange 15, as shown in Fig. 3, the purpose of which will be later pointed out. The collar 17 is connected by a radial flange portion 18 to a second collar or sleeve 19 of a larger diameter than collar 17 and overlying the front tubular portion 11, as clearly illustrated in Fig. 3. The collar 19 provides an operating portion by which ring 17 may be rotated and moved axially relative to the portion 12 for reasons to be later more fully described. The ring 17 has formed thereon adjacent the rear end thereof, a plurality, preferably three, radially extending lugs 21 of the shape best shown in Fig. 2.

It will thus be apparent, from the above description, that rotation of the collar 19 will serve to rotate sleeve 17 as a unit therewith. Such rotation, due to the left thread 16, will also cause ring 17 to move axially along the thread 16 and to the left, relative to the portion 12, as viewed in Fig. 3. The direction of such axial movement will depend, of course, on the direction of rotation of collar 19 and ring 17. The rotation of the ring 17 and collar 19 is preferably limited to less than 360° and preferably to about 60°. To secure this result, the outer periphery of the portion 11 of the mount adjacent the shoulder 13 has milled therein a slot 20. This slot has positioned therein a pair of circumferentially spaced screws 23 which are adapted to be engaged by a screw 24 secured to and depending from collar 19, as clearly illustrated in Fig. 3. Thus, as the collar 19 and ring 17 are turned, the screw 24 will engage finally one of the screws 23 in portion 11 to limit the rotative movement of the collar and ring relative to the mount. The particular screw 23 engaged by the screw 24 will depend, of course, upon the relative direction of rotation of the collar and ring.

The lens mount, above described, is adapted to be attached releasably to a suitable support, such as the mechanism above described. To secure this result, the support member designated by the numeral 30 is provided with an aperture 31 of such size and shape as to receive slidably the part of the tubular portion 12 to the right of the flange 15, as shown in Fig. 3, to receive and support the lens mount on the support 30. Also, to the left of aperture 31, as viewed Fig. 3, the support 30 is formed with an open peripheral or annular slot 32 which provides a pair of radially extending axially spaced walls 33 and 34, the former having the aperture 31 formed therein. Also, the left wall 34 is formed with an opening or aperture 35 which is of a larger diameter than, but is concentric with, the aperture 31 of wall 33. The aperture 35 is slightly larger than the diameter of the flange 15 and the ring 17 to permit the flange and ring to pass freely through the aperture 35 and into the groove 32, as clearly illustrated in Figs. 2 and 3.

Extending upward from the inner edge of wall 33, the latter is provided with a plurality of, in the present instance three, slots 37 of such a size and shape as to permit the free axial passage of the lugs 21 therethrough. In order to facilitate the placing of the lens mount in proper relation on the support 30, the wall 33 is provided with an axially extending pin 38 which extends or projects into the slot 32 and which is adapted to be received in a recess or slot 39 formed on the periphery 40 of the flange 15. This pin-and-slot connection also prevents the turning of the mount relative to the support 30.

In assembling the mount on the support, the mount is positioned with the slot 39 in axial aligned arrangement with pin 38 and with the lugs 21 in alignment with the slots 37. The rear lateral portion 12 of the mount is then slid axially through the aperture 31 which serves to support and hold the mount on the support 30. Such axial movement serves to shift the flange 15 and the ring 17 through the opening 35 in wall 34, and also to move the lugs 21 through the registering slots 37 to position both the flange 15 and the lugs 21 in the annular slot 32, as clearly shown in Figs. 2 and 3. Such axial movement of the mount will finally bring the rear surface 41 of the flange 15 into abutting relation with the left surface 42 of the wall 33 to limit the rightward movement of the lens mount to position the latter axially relative to the support, the purpose of which is deemed apparent to those familiar with such structures.

When the flange 15 and the lugs 21 have been positioned in slot 32, a clockwise rotation, as viewed in Fig. 2 is imparted to the collar 19, to similarly turn sleeve 17 and lugs 21. Due to the lefthanded thread 16, such clockwise rotation of ring 17 will serve to first move the lugs 21 out of registering relation with slots 37 and behind wall 34; and, second, to move or shift the ring 17 and lugs 21 axially relative to the mount or to the left, as viewed in Fig. 3. Such leftward movement of the ring 17 finally serves to bring the left faces of lugs 21 into abutting and pressing engagement with the right face of the wall 33, as viewed in Fig. 3, to wedge the lugs 21 and the flange 15 tight against the axially spaced walls 33 and 34 respectively, to lock the mount on the support 30, the advantages of which are deemed apparent from an inspection of the drawings.

When the mount is to be disconnected, it is merely necessary to grasp the collar or operating portion 19 of the locking ring and to impart a counterclockwise rotation thereto. Due to the lefthanded thread 16 this counterclockwise movement will first serve to move ring 17, and hence lugs 21, axially to the right as viewed in Fig. 3, to shift the lugs 21 and flange 15 out of locking relation with the walls 33 and 34 respectively. Further counterclockwise rotation will finally bring the lugs 21 into registry with the slots 37. Thereupon, the mount may be moved axially to the left to shift the lugs 21 leftward through the slots 37 and to withdraw the ring 17 and flanges 15 and the portion 12 through the opening in the front wall 33 to detach the mount from the support.

The present invention thus provides a new and improved mechanism or bayonet lock for connecting a lens mount or other member detachably to a support, and for accurately positioning the member both axially and radially relative to the support.

While one embodiment of the invention has been disclosed, it is to be understood that the inventive idea may be carried out in a number of ways. Therefore, the present application is not to be limited to the precise details described, but is intended to cover all variations and modifications covered by the appended claims.

What I claim and desire to secure by Letters Patent of the United States:

1. A lens tube mounting mechanism comprising, in combination, a support formed with an axially extending tube receiving and supporting aperture and an open annular groove positioned adjacent said aperture and having radially extending axially spaced walls, one of said walls being spaced axially from said aperture and having an opening of larger diameter than, but aligned with, said aperture and radial slots extending outwardly from said opening, a tubular portion on said lens tube extending through said opening and positioned and supported in said aperture, a radially extending flange on said portion positioned in said groove adjacent the other wall, a ring threadably mounted on said tubular portion and spaced axially from said flange and extending through said opening, radially projecting lugs on said ring positionable in registry with and passable through said slots to position said lugs in said groove adjacent said one wall, said ring being rotatable on said tubular portion to move said lugs out of registry with said slots and to move said ring and lugs axially of said tubular portion and away from said flange to wedge said lugs and flange against said walls to lock said tubular portion on said support, and means for rotating said ring.

2. A lens tube mounting mechanism comprising, in combination, a support formed with an axially extending tube receiving and supporting aperture and an open annular groove positioned adjacent said aperture and having radially extending axially spaced walls, one of said walls being spaced axially from said aperture and having an opening of larger diameter than, but aligned with, said aperture and radial slots extending outwardly from said opening, a tubular portion on said lens tube extending through said opening and positioned and supported in said aperture, a flange on said tubular portion engaging the other wall adjacent said aperture to limit the axial movement of said portion relative to said support to position said tubular portion on said support, a ring threadably mounted on said tube and spaced axially from said flange, radially extending lugs formed on said ring, said ring having a diameter less than said opening to permit said ring to pass through said opening when positioned in registry therewith to move said lugs into said groove, said ring being rotatable relative to said tubular portion and support to move said lugs out of registry with said openings and to shift said lugs axially relative to said tubular portion and away from said flange to wedge said flange and lugs against said walls to lock said tubular portion on said support, and moving means for said ring.

3. A lens tube mounting mechanism comprising, in combination, a support formed with an axially extending tube receiving and supporting aperture and an open annular groove positioned adjacent said aperture and having radially extending axially spaced walls, one of said walls being spaced axially from said aperture and having an opening of larger diameter than, but aligned with, said aperture and radial slots extending outwardly from said opening, a tubular portion on said lens tube extending through said opening and positioned and supported in said aperture, a peripheral flange projecting radially from said tubular portion adjacent said portion said flange having a diameter less than said opening so as to pass freely axially therethrough but greater than said aperture so as to abut said other wall to limit the axial movement of said tubular portion in one direction relative to said support to position said tubular portion axially thereon, a ring carried by said tubular portion and having a diameter substantially equal to said flange to permit said ring to pass through said opening, means for mounting said ring for axial movement relative to said tube, lugs projecting radially from said ring and adapted to pass axially through said slots and into said groove when positioned in registry with said opening, and means both to rotate said ring on said tubular portion to shift said lugs out of registry with said openings and to move said ring and lugs axially of said tubular portion and away from said flange to clamp said flange and lugs against the walls of said groove to lock said tubular portion releasably on said support.

4. A lens tube mounting mechanism comprising, in combination, a support formed with an axially extending tube receiving and supporting aperture and an open annular groove positioned adjacent said aperture and having radially extending axially spaced walls, one of said walls being spaced axially from said aperture and having an opening of larger diameter than, but aligned with, said aperture and radial slots extending outwardly from said opening, a tubular portion on said lens tube extending through opening and positioned and supported in said aperture, a radially extending flange on said portion positioned in said groove adjacent the other wall, said flange having an axially extending recess formed therein, a pin on said support and projecting from the other wall into said groove and positioned in said recess to position said tubular portion circumferentially relative to said support, a ring threadably mounted on said tube and spaced axially from said flange and extending through said opening, radially projecting lugs on said ring positionable in registry with and passable through said slots to position said lugs in said groove adjacent said one wall, said ring being rotatable on said tubular portion to move said lugs out of registry with said opening and to move said ring and lugs axially of said tubular portion and away from said flange to wedge said lugs and flange against said walls to lock said tubular portion on said support, and means for rotating said ring.

5. A lens tube mounting mechanism comprising, in combination, a support formed with an axially extending tube receiving and supporting aperture and an open annular groove positioned adjacent said aperture and having radially extending axially spaced walls, one of said walls being spaced axially from said aperture and having an opening of larger diameter than, but aligned with, said first aperture and radial slots extending outwardly from said opening, a tubular portion on said lens tube extending through said opening and positioned and supported in said aperture, a peripheral flange projecting radially from said tubular portion adjacent said portion, said flange having a diameter less than said opening so as to pass freely axially therethrough but greater than said aperture so as to abut said other wall to limit the axial movement of said tubular portion in one direction relative to said support to position said tubular portion axially thereon, a ring carried by said tubular portion and having a diameter substantially equal to said flange to permit said ring to pass through said opening, means for mounting said ring for axial movement relative to said tubular portion, lugs projecting radially from said ring and adapted to pass axially through said slots and into said groove when positioned in registry with said slots, means both to rotate said ring on said tubular portion to shift said lugs out of registry with said slots and to move said ring and lugs axially of said tubular portion and away from said flange to clamp said flange and lugs against the walls of said groove to lock said tubular portion releasably on said support, and cooperating means on said flange and said other wall to retain said tubular portion against rotation on said support.

6. A lens tube mounting mechanism comprising, in combination, a support formed with an axially extending tube receiving and supporting aperture and an open annular groove positioned adjacent said aperture and having radially extending spaced walls, one of said walls being spaced axially from said aperture and having an opening of larger diameter than, but aligned with, said first aperture and radial slots extending outwardly from said aperture, a tubular portion on said lens tube extending through said opening and positioned and supported in said aperture, a radially extending flange on said portion positioned in said groove adjacent the other wall, a ring threadably mounted on said tube and spaced axially from said flange and extending through said opening, radially projecting lugs on said rings positionable in registry with and passable through said slots to position said lugs in said groove adjacent said one wall, said ring being rotatable on said tubular portion to move said lugs out of registry with said slots and to move said ring and lugs axially of said tubular portion and away from said flange to wedge said lugs and flange against said walls to lock said tubular portion on said support, means for rotating said ring, and cooperating means on said ring and said tubular portion to limit rotation of said ring relative to said tubular portion.

References Cited in the file of this patent

UNITED STATES PATENTS

| | | |
|---|---|---|
| 2,052,261 | Verschoor | Aug. 25, 1936 |
| 2,136,149 | Nuchterlein | Nov. 8, 1938 |
| 2,260,991 | Gorey | Oct. 28, 1941 |
| 2,618,201 | Brohl et al. | Nov. 18, 1952 |
| 2,649,024 | Goldhammer | Aug. 18, 1953 |